United States Patent [19]

Wauquier et al.

[11] Patent Number: 4,473,118

[45] Date of Patent: Sep. 25, 1984

[54] ENHANCED OIL RECOVERY USING OXIDIZED CRUDE OIL

[75] Inventors: Jean-Pierre Wauquier, Givors; Bernard Sillion, Rocquencourt; Raymond Boulet, Savigny sur Orge; Louis Cuiec, Feucherolles; Christian Vacher, Grenoble, all of France

[73] Assignee: Institut Francais du Petrole, Rueil-Malmaison, France

[21] Appl. No.: 345,104

[22] Filed: Feb. 2, 1982

[30] Foreign Application Priority Data

Feb. 2, 1981 [FR] France .................... 81 02084

[51] Int. Cl.$^3$ ........................................... E21B 43/22
[52] U.S. Cl. ............................ 166/274; 252/8.55 D
[58] Field of Search ........... 166/275, 274, 273, 305 R, 166/307, 270; 252/8.55 D

[56] References Cited

U.S. PATENT DOCUMENTS

| | | | |
|---|---|---|---|
| 3,195,629 | 7/1965 | Leach .................................. | 166/273 |
| 3,482,636 | 12/1969 | Crowe ................................. | 166/307 |
| 3,556,221 | 1/1971 | Haws et al. ...................... | 166/305 R |
| 3,709,297 | 1/1973 | Christopher, Jr. et al. .... | 166/274 X |
| 3,710,861 | 1/1973 | Ver Steeg ....................... | 166/273 X |
| 3,731,741 | 5/1973 | Palmer et al. .................... | 166/274 X |
| 3,757,861 | 9/1973 | Routson ........................... | 166/274 X |
| 3,927,716 | 12/1975 | Burdyn et al. ................... | 166/274 X |
| 3,994,344 | 11/1976 | Friedman ......................... | 166/274 X |
| 4,008,769 | 2/1977 | Chang .................................. | 166/274 |
| 4,059,154 | 11/1977 | Braden, Jr. et al. ................ | 166/274 |

Primary Examiner—Stephen J. Novosad
Attorney, Agent, or Firm—Millen & White

[57] ABSTRACT

Enhanced recovery of oil from oil fields is effected by making use of an inexpensive surface-active agent formed by oxidizing a portion of crude oil with an aqueous solution of sodium hypochlorite at a temperature of 20°–180° C. The oxidized crude can be injected in the field in admixture with non-oxidized crude or with water as a micro-emulsion.

15 Claims, 2 Drawing Figures

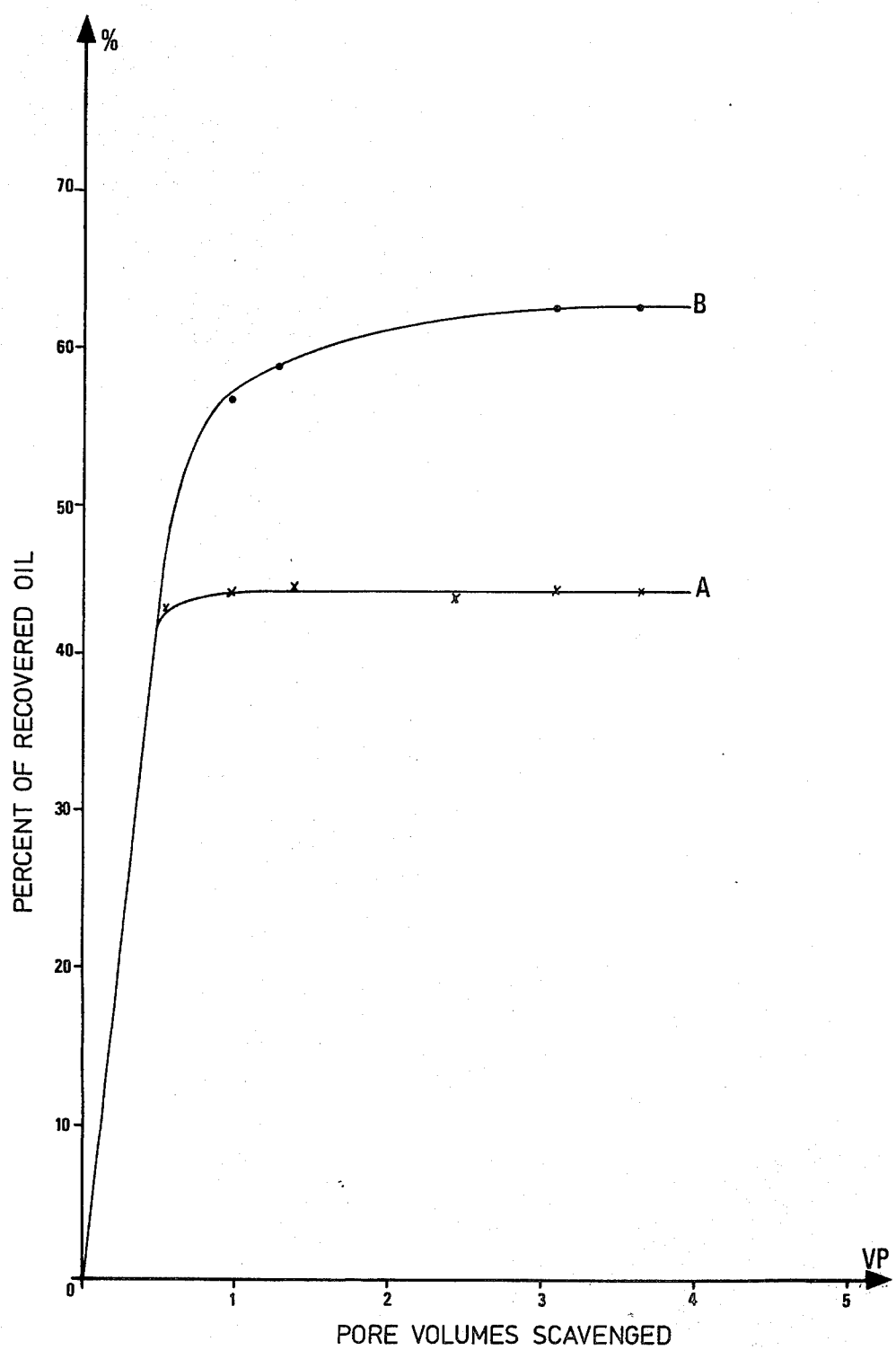

ENHANCED OIL RECOVERY USING OXIDIZED CRUDE OIL

BACKGROUND OF THE INVENTION

This invention concerns enhanced oil recovery making use of new surface-active agents.

Among the techniques used to improve the productivity of oil fields, the methods based on the use of chemical products are the object of numerous researches. These methods consist of injecting said chemical products in the field in a suitable form, through at least one injection well, of circulating them through the formation and of recovering the displaced hydrocarbons from at least one production well.

It is known that two main types of compounds may be injected in an oil formation: hydrosoluble polymers which have the object of decreasing the mobility of water; and surface-active substances acting by lowering the interfacial tension between the oil and the water so as to reduce the capillary forces which maintain the oil in the rock. These surface-active substances may be either ionic or non-ionic.

The development of enhanced recovery methods making use of chemical products is obviously dependent on the efficiency of said products, but also on economic factors and, among them, on the cost of the supplementary investments resulting from the application of the processes and from the cost of the products to be injected, the recovery of which can hardly be envisaged in the present state of the art.

An important object is thus to make efficient chemical products available at low cost for the exploitation of the fields.

SUMMARY OF THE INVENTION

The present invention has this object. It has now been found to be possible, by a mere oxidation technique, to modify a crude oil so as to confer upon it surface-active properties such that the modified crude oil may be used directly for enhanced oil recovery, without requiring the separation of the so-formed surface-active substances from the remainder of the crude oil from which they have been formed.

The present method has the advantage of being adapted to a combination with other methods, particularly thermal methods such as steam injection, used for the recovery of heavy oils, for example those of Athabasca (Canada) or of the Orinoco Belt (Venezuela). The alkaline solutions used as flushing fluid may also contain usual additives, for example surface-active agents other than those prepared according to the invention, e.g., guanidine hydrochloride or fatty acid salts.

The fields which would benefit most from the present process are those containing a crude oil whose acid number is equal to or lower than 0.5 mg KOH/g.

In general, the process of the invention makes use, for enhanced oil recovery, of new compositions of modified crude oil having surface-active properties, obtained by reaction of a crude oil or a crude oil fraction with an alkali or alkaline-earth metal hypochlorite.

BRIEF DESCRIPTION OF THE DRAWINGS

FIG. 2 is a plot of the percentage of recovered oil as a function of the pore volume scavenged, for conventional scavenging (curve A) and according to the invention (curve B).

DETAILED DESCRIPTION

Figure 1:
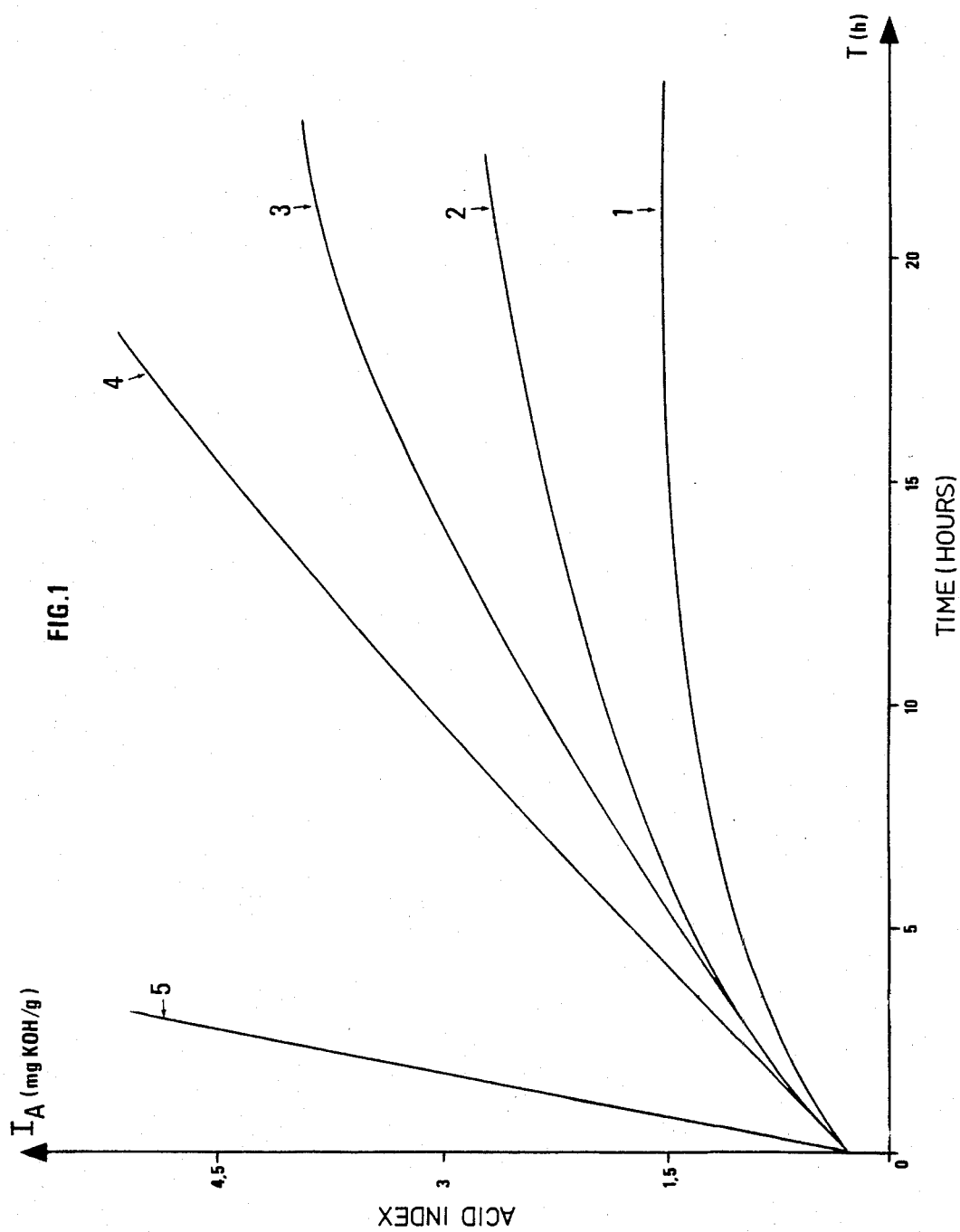
FIG. 1 is a plot of the acid index as a function of the treatment time, for samples of crude oil treated with sodium hypochlorite according to the invention.

The oxidation of the crude oil or a fraction thereof by means of a hypochlorite is effected for example by reacting, at a temperature from 20° to 180° C. (preferably 40° to 90° C. when operating under normal pressure), a crude oil with a convenient proportion of hypochlorite, for example sodium hypochlorite, in aqueous solution (the aqueous solution having a hypochlorite concentration of, for example, 0.5 to 2 moles/liter). It is also possible, if so desired, to separate the two formed phases: the hydrocarbon phase contains the desired oxidized crude oil, whose acid number is substantially increased and which exhibits surface-active properties.

The oxidized crude petroleum may then be injected in the oil field through an injection well, either as such or in admixture with non-oxidized crude oil or, alternatively, in the form of a micro-emulsion containing an aqueous phase, for example water from the field, and a crude oil phase at least a portion of which has been oxidized according to the technique of the invention.

The micro-emulsion may contain, by weight, 20–75% of hydrocarbons (oxidized) and 80–25% of aqueous phase.

Behind the so-formed slug, it is advantageous to inject a conventional alkaline aqueous solution, for example a solution of sodium hydroxide and/or an aqueous solution of a thickening agent, for example a solution of polysaccharide or polyacrylamide. Sodium hydroxide is used, for example, at a concentration of 0.0025–10% of the weight of aqueous solution.

It is also possible to effect the oxidation in situ by injecting a hypochlorite solution into the formation: the hypochlorite oxidizes the first crude oil fractions with which it is contacted and these oxidized fractions may then be used directly as a slug driven by the sodium hydroxide aqueous solution, for enhanced oil recovery.

The crude oils liable to lead to the formation of surface-active compositions according to the invention may consist, on the one hand, of neutral crude oils (or crudes of low acidity) such for example as the crudes from Edjeleh ($I_A=0.25$), Peycorade ($I_A=0.72$) or upper Lacq ($I_A=0.88$); and, on the other hand, of crudes having a certain acidity, such for example as the crudes produced from the fields of Emeraude ($I_A=1.53$), Grenade/Adour ($I_A=1.55$), or Emlischeim ($I_A=3.16$). The acid numbers $I_A$ are expressed in mg KOH/g of crude oil.

Although this is not strictly necessary, the crude oil subjected to oxidation in order to impart to it surface-active properties is preferably a crude oil extracted from the field to be treated for enhanced oil recovery. When, in this latter case, the acid number of the treated oil has a value of less than 0.5 mg KOH/g, it is advantageous to continue the oxidation treatment until an acid number of at least 1 mg KOH/g is obtained.

All the oxidants are not equivalent for modifying the surface-active properties of the crude oil and its fractions; it seems that hypochlorites lead to better results than the other conventional oxidants.

In addition, the acidity conferred by the treatment of the invention does not appear to be of the same type as that which is naturally present in certain crude oils.

The proportion of hypochlorite to be used to obtain the oxidized crude oil containing surface-active substances according to the invention, depends on a certain number of factors, particularly the reaction temperature, the concentration of the hypochlorite aqueous solution used and the concentration of surface-active agent which it is desired to obtain (concentration expressed as acid number of the oxidized crude oil).

As a general rule, when it is desired to obtain acid numbers from 2 to 5 mg KOH/g, sufficient to impart surface active properties to the crude oil there will be used hypochlorite proportions (calculated as NaOCl) from 5 to 10 moles per kg of crude to be oxidized. These values are not limitative and in some cases, it may be desirable to obtain much higher acid numbers (for example up to 50 or 60 mg KOH/g). In such a case, hypochlorite can be used in a proportion of up to about 25 moles per kg of crude to be oxidized.

The oxidation reaction may last, for example, from 1 to 60 hours.

During the step of crude oil oxidation, the operation is generally conducted in heterogeneous phase, the hypochlorite solution being insoluble in the crude oil; there may be used phase transfer agents in order to transfer the oxidizing anion to the organic phase within the mass to be oxidized. The transfer agent favors the oxidation during the first hours of treatment but, over the whole duration of the operation, its efficiency is not so high (as to the yield of the operation and the quality of the obtained surface-active species). As phase transfer agents (dispersing agents) there can be used, for example, quaternary ammonium salts in small proportions.

It is also possible to conduct the oxidation in the presence of a catalyst, for example ruthenium oxide. The catalysts of this type may be used at low concentrations, for example from 0.01 to 0.5%, with respect to the weight of treated crude oil. In these conditions, higher oxidation velocities are observed, but the oxidized crude oil has properties similar to those of the crudes directly oxidized by the hypochlorite anion.

In order to facilitate the handling of the product, it is possible to make use of a light hydrocarbon diluent, such for example as hexane or benzene, which is a better solvent for the asphaltenes. In this case, the crude oil oxidation reaction may be conducted at the reflux temperature of the diluent, which will be removed from the organic phase, for example by evaporation after separation of the two phases.

After oxidation, the crude oil oxidized according to the invention may be separated from the aqueous phase containing the oxidant by mere decantation and may be used without further transformation.

In addition, one of the advantages of the process for oxidizing crudes according to the invention is that the latter may be oxidized without preliminary treatment: particularly the presence of a high proportion of sulfur or nitrogen compounds, which may be detrimental to the sulfonation techniques, does not inhibit the formation of oxidation products according to the techniques of the invention.

The oxidized crudes according to the invention exhibit surface-active properties; these properties are made apparent from the measurement of the interfacial tension between a sodium hydroxide solution and the initial crude oil and between the same sodium hydroxide solution and the initial crude oil to which has been added a small amount of oxidized crude oil (usually about 10% by weight).

Generally, the interfacial tension between a neutral crude oil and a sodium hydroxide solution is from 1 to 50 mN/m. The addition of oxidized crude oil according to the invention provides interfacial tensions between $10^{-3}$ and $10^{-1}$ mN/m. This lowering of the interfacial tension may be observed within a large range of salinity comprised for example between 0 g/l and 150 g/l of sodium chloride.

It has been observed that the surface-active products formed according to the invention by oxidation of crude oils, are no longer efficient in the presence of divalent ions such as $Mg^{2+}$ or $Ca^{2+}$. In this case, however, the oxidized crude compositions according to the invention may be used jointly with non-ionic surface-active agents. Thus, under saline conditions and in the presence of divalent ions, wherein the oxidized crude was inefficient, it is possible to obtain a phase diagram of the WINSOR III type by admixture of the two surface-active agents with a proportion of intermediate phase called microemulsion, substantially greater than in the case of use of non-ionic surface-active agent alone.

The non-ionic surface-active agents which can be used in this case, in admixture with oxidized crude oils, are, for example, polyoxyethylene alcohols or polyoxyethylene alkylphenols of the trade.

The microemulsions obtained with a non-ionic surface-active agent will have, for example, the following composition:
oxidized crude oil: 5–50% by weight
crude oil: 0–40% by weight
non-ionic surface-active agent: 2–15% by weight
alkaline water: 20–60% by weight
By way of example:
crude: 39%
oxidized crude: 15%
non-ionic surface-active agent: 7%
alkaline field water: 39%

The technique then consists of injecting a limited volume (about 10% with respect to the oil to be displaced) of microemulsion followed with water, whose penetration is stabilized by polymers, which will move the oil deposit in place towards the producing well(s).

The following non limitative examples illustrate the invention.

EXAMPLE 1

This example concerns the oxidation, by means of sodium hypochlorite, of a crude oil whose acid number is already relatively high.

The concerned crude was extracted from the French field of Emlischeim (it has an acid number of 3.16 mg KOH/g).

In a glass reactor of 250 cc, provided with an efficient stirring system and a compensating jacket, there is introduced:
4 g of degased crude oil
100 ml of hexane of technical grade
50 ml of tap water
50 ml of sodium hypochlorite solution at 1.8 mole/l
2 drops of an aqueous solution of a quaternary ammonium salt having the trade reference A1 336, acting as phase transfer agent.

The mixture is maintained under stirring for 30 h at reflux. The temperature is maintained at 64° C. At the end of this period, the two phases are settled, the hydrocarbon upper phase is recovered, the solvent (hexane) is removed by vacuum evaporation and 4 grams of crude oil are recovered, the acid number of which is determined by usual means. Under the above indicated conditions, the acid number has been brought to 54.81 mg KOH/g. The oxidized crude oil is directly obtained in a neutral form, as a result of the alkalinity of the hypochlorite solution itself.

Tests are then effected to determine the suitability of the oxidized crude as surface-active agent for enhanced oil recovery.

TEST A1

One part of oxidized crude is admixed with 9 parts of non-oxidized crude and 5 g of the resulting mixture is contact with 5 g of dilute sodium hydroxide (pH=12) containing 50 g/l NaCl, in a graduated test tube.

After vigorous stirring, followed with a rest period of 24 h at 30° C., the behavior of the phases is observed and it becomes apparent that the dark-colored upper phase increased by weight (about 6 g) while remaining fluid and clear. There is thus obtained a microemulsion of the WINSOR II type. The interfacial tension as measured by method of the turning drop, was $\gamma = 0.5$ mN/m. A blank test effected in the same conditions but without oxidized crude oil, provided a value $\gamma = 7$ mN/m.

The WINSOR II type microemulsion gives satisfactory results in enhanced recovery of a crude oil having an acid number of 0.2 mg KOH/g.

TEST A2

To 5 g of a mixture consisting of one part of oxidized crude and 9 parts of crude, there is added 0.3 g of polyoxyethyl nonylphenol and then 5 g of dilute sodium hydroxide at a pH of 12 containing 50 g/l NaCl and 1 g/l $CaCl_2$. It is observed that a diphasic mixture of the WINSOR II type appears with about 7 g of upper phase. No precipitation is observed, even after 3 weeks of rest. The resultant microemulsion has been tested for enhanced recovery and gave results similar to those of the microemulsion of test A1.

TEST B

Another comparative test is effected with the oxidized crude oil of example 1, as described below: capillary tubes filled on the one hand with crude oil and, on the other hand, with a mixture of crude with oxidized crude in the proportion of 100/1, are immersed vertically into a sodium hydroxide dilute aqueous solution (0.01 Normal). It is observed that the capillary tube filled with the mixture of crude with oxidized crude empties quickly while forming a string of micro-droplets which become coalescent at the upper part.

The other capillary tube empties only very slowly.

This test is qualitative and may be used as a guide for a subsequent qualification.

EXAMPLE 2

This example concerns the oxidation of a crude oil of low acid number. The oil used is produced from the French field "Peycorade". Its acid number is 0.72 mg KOH/g. The operating conditions are the same as in example 1.

The oxidized crude has an acid number of 3.57 mg KOH/g. The increase of the acid number is thus clearly lower than in example 1.

The preparation of a microemulsion is effected by contacting 5 g of a mixture comprising one part of oxidized crude and 9 parts of non-oxidized crude with 5 g of a 0.01N sodium hydroxide solution containing 10 g/l NaCl.

After stirring followed with a settling for 24 h at 30° C., three phases are observed: an upper phase (about 1 g) consisting essentially of non-oxidized crude, a lower phase (about 2 g) consisting essentially of alkaline water, slightly yellow colored, and an intermediate phase (about 7 g) containing practically all the oxidized crude. The distribution of the phases is characteristic of a behavior of WINSOR III type. The intermediate phase is a microemulsion. The measurement of the interfacial tension between the upper phase and the intermediate phase, on the one hand, and between the intermediate phase and the lower phase, on the other hand, give respectively values of 0.7 mN/m and 0.1 mN/m.

The above microemulsion had a satisfactory behavior in enhanced recovery operations.

EXAMPLE 3

This example illustrates the case of oxidation of a crude having a very low initial acid number. The concerned crude was produced from the Edjeleh field (Algeria). It has an initial acid index of 0.25 mg KOH/g. The operating conditions are different from those of example 1.

In a glass reactor of 1 liter capacity, provided with an efficient stirring system and a compensating jacket, there is introduced:
- 40 g of Edjeleh crude oil
- 400 ml of hexane
- 500 ml of sodium hypochlorite solution at 1.2 mole/liter
- 10 g of 1% by weight solution of quaternary ammonium salt, acting as phase transfer agent.

The reflux temperature (64° C.) is maintained for 45 hours and, after settling, 42 g of oxidized crude having an acid number of 2 mg KOH/g are recovered.

In order to avoid the detrimental effects of calcium ions, the surface-active agent of the oxidized crude of anionic character is used in combination with a non-ionic surface-active agent. For this purpose, the following tests have been effected.

To 4.7 g of salted water (of Zarzaitine type, carboniferous A, containing 18 g/l NaCl, 3 g/l $CaCl_2$, 1.5 g/l $MgCl_2$, 6 $H_2O$) there is added 4.7 g of degased Edjeleh crude oil and then x g of oxidized Edjeleh crude oil and y g of polyethoxy nonylphenol having 6 ethylene oxides, x having respective values of 0-0.6-1.2-1.8 and y the values of 0-0.3-0.6-0.9. No alcohol is added.

After stirring followed with a settling period of 72 h at 30° C., the percent by weight of the different phases obtained (2 or 3 according to the case) is measured.

When three phases are present, the microemulsion phase is the intermediate phase. When only two phases are present, the microemulsion phase is that of greater volume.

The results of the tests are reported in the following Table:

| | No TEST | | | | | | | | | | |
|---|---|---|---|---|---|---|---|---|---|---|---|
| | 1 | 2 | 3 | 4 | 5 | 6 | 7 | 8 | 9 | 10 | 11 |
| Water g | 4.7 | 4.7 | 4.7 | 4.7 | 4.7 | 4.7 | 4.7 | 4.7 | 4.7 | 4.7 | 4.7 |
| Crude g | 4.7 | 4.7 | 4.7 | 4.7 | 4.7 | 4.7 | 4.7 | 4.7 | 4.7 | 4.7 | 4.7 |
| Oxidized crude (x, in g) | 0 | 0.6 | 1.2 | 1.8 | 0.6 | 1.2 | 1.8 | 0.6 | 1.2 | 1.8 | 0.6 |
| NP 60 E* (y, in g) | 0.6 | 0.6 | 0.6 | 0.6 | 0.3 | 0.3 | 0.3 | 0.9 | 0.9 | 0.9 | 0 |
| Phases | | | | | | | | | | | |

-continued

| | No TEST | | | | | | | | | | |
|---|---|---|---|---|---|---|---|---|---|---|---|
| | 1 | 2 | 3 | 4 | 5 | 6 | 7 | 8 | 9 | 10 | 11 |
| Upper % b.w. | 31 | 20 | 10 | 2 | 30 | 31 | 12 | 11 | 1 | — | 39 |
| Inter % b.w. | 42 | — | — | — | 57 | 66 | 82 | — | — | 100 | — |
| Lower % b.w. | 27 | 80 | 90 | 98 | 13 | 3 | 6 | 89 | 99 | — | 61 |

*NP 60 E: polyethoxylated nonylphenol with 6 ethylene oxides.

As a conclusion of said series of tests and while considering the quality of the surface-active agents and their capacity to extend the micro-emulsion domain, it is first observed that the addition of a non-ionic surface-active agent makes it possible to avoid the detrimental effect of the calcium ion (precipitation occurred only in tube 11).

On the other hand, while it does not appear evident that a significant synergic effect occurs, it is observed that both surface-active agents act together to increase the micro-emulsion domain.

All the obtained micro-emulsions give satisfactory results in enhanced oil recovery.

EXAMPLE 4

The operating conditions of example 3 are repeated except that the quaternary ammonium salt solution is omitted.

After 24 hours, there is obtained, after treatment, 42 g of oxidized crude having an acid number of 1.9 mg KOH/g.

The absence of transfer agent does not substantially change either the yield of the operation or the quality of the obtained surface-active species.

EXAMPLE 5

Crude from Edjeleh is oxidized in the same conditions as in example 3, except that both the transfer agent and the diluent (hexane) are omitted. In these conditions, the temperature is, of course, no longer determined by the hexane boiling, but it can be easily maintained at 50° C. by means of the compensating jacket. After 22 hours of stirring, the operation is discontinued, the phases are settled and 39 g of oxidized crude having an acid number of 2.75 mg KOH/g are recovered.

These results show that the presence of a light solvent is not at all indispensable to the obtainment of a good surface-active property.

EXAMPLE 6

There is admixed:
40 of Edjeleh crude oil
500 ml of 1.2 mole/l hypochlorite solution and
30 mg of ruthenium oxide.

The resulting mixture is stirred for 22 hours at 50° C.

After filtration and settling of the phases, there is obtained 42 g of an oxidized crude having an acid number 6.30 mg KOH/g.

This result shows that the presence of an oxygen carrier such as ruthenium oxide speeds up the process of crude oil oxidiation.

The oxidized crude is put in the form of a micro-emulsion as described in example 1.

EXAMPLE 7

In order to define more accurately the effect of the different parameters on the oxidation velocity, a series of tests has been conducted which are reported in this example.

In all these tests, there was used 40 g of degased Edjeleh crude oil ($I_A = 0.25$) either in the presence or in the absence of oxide, solvent and transfer agent and the temperature was allowed to vary while plotting versus time the increase of the acid index.

The results are shown in FIG. 1 on which:

Curve (1) is characterized by a temperature of 64° C and the presence of hexane and a transfer agent (1% by weight i.e. 400 mg).

Curve (2) corresponds to a temperature of 50° C. and to the absence of hexane and transfer agent. The comparison of curves (1) and (2) shows that the use of a diluent is not advantageous with crudes of low viscosity such as that from Edjeleh.

Curve (3) differs from curve (2) only by the temperature (64° C.) A temperature increase favors the reaction.

Curve (4) corresponds to the same conditions as curve (2) but with the addition of ruthenium oxide in a proportion of 0.06% by weight (i.e. 24 mg).

Curve (5) corresponds to a proportion of ruthenium oxide 1% by weight (i.e. 400 mg).

The presence of a low amount of ruthenium oxide considerably speeds up the process (comparison of curves (2) and (4) on the one hand, (4) and (5) on the other hand).

From the results of this example, it may be concluded that the diluent must not be used except when strictly necessary for the handling of the product, that the transfer agent has no essential effect, that a temperature increase is favorable (provided that the decomposition of the hypochlorite is not preferentially speeded up), that the presence of ruthenium oxide is favorable as far as kinetics are concerned, but that technological and economic considerations must be taken into account in the case of use of even small amounts of said oxide.

EXAMPLE 8

This example makes evident the improvement in the recovery of oil entrapped in a porous medium, by making use of surface-active solutions of oxidized crude according to the invention.

Two tests pieces A and B of Fontainebleau sandstone of similar porosities are saturated in a first step with a saline solution containing 30 g/l of sodium chloride and then with Edjeleh crude ($I_A = 0.25$ mg KOH/g), up to the maximum saturation with oil after a continuous scavenging of 10 P.V. (ten times the pore volume).

The test pieces are maintained in their state (maximum saturation with oil in the presence of residual salted water) for a night.

The test piece A is continuously scavenged at a velocity of 5 ml/h with an alkaline and salted aqueous solution (NaOH: 20 g/l) (NaCl: 30 g/l).

The test piece B is scavenged in a first stage by means of a slug of oxidized oil ($I_A = 8$ mg KOH/g) whose volume amounts to 20% of the oil remaining in place, and then with an alkaline and salted aqueous solution (NaOH: 20 g/l-NaCl: 30 g/l).

The efficiency of the enhanced recovery with sodium hydroxide is shown in FIG. 2 where the ordinates represent the percent of recovered oil with respect to the oil remaining in place and the abscissae the number of pore volumes scavenged by the aqueous phase (containing 20 g/l of sodium hydroxide and 30 g/l of sodium chloride).

In the case of use of the oxidized crude according to the invention, it is observed that the recovery rate is noticeably improved and exceeds 60%.

EXAMPLE 9

This example shows the specific surface-active power of the product obtained by oxidation of the Edjeleh crude by means of sodium hypochlorite. The following table indicates for a constant acid number the interfacial tensions measured between Edjeleh crude oil and a $10^{-2}$ N sodium hydroxide solution, for different fatty acids of variable molecular weight, as well as for the Edjeleh crude oil oxidized with sodium hypochlorite.

The following observations can be made:

The interfacial tension becomes minimum for $C_{18}$ acids.

At an equivalent average molecular weight ($C_{18}$), the acids obtained by crude oil oxidation produce a much greater lowering of the interfacial tension than the linear $C_{18}$ acids.

| NATURE OF THE ACID USED TO OBTAIN THE SOLUTION HAVING AN ACID NUMBER OF 1.2 mg KOH/g | INTERFACIAL TENSION MEASURED BETWEEN THE OIL AND A $10^{-2}$ N SODIUM HYDROXIDE SOLUTION (mN/m) |
|---|---|
| C9 | 1 |
| C12 | 0.9 |
| C14 | 0.7 |
| C15 | 0.3 |
| C17 | 0.2 |
| C18 stearic (oleic) | 0.1 (0.08) |
| acids obtained by oxidation of Edjeleh crude oil | 0.005 |
| C20 | 0.3 |
| C22 | 0.4 |
| C25 | 0.8 |

What is claimed is:

1. In a process for enhanced oil recovery from a subterranean oil field in which are bored separate injection and production wells, said process comprising introducing a surface-active agent in the injection well and displacing said surface-active agent in the formation, together with displaced hydrocarbons, toward the production well, the improvement wherein said enhanced recovery is effected by displacing a surface-active agent consisting essentially of an oxidized crude oil or crude oil fraction having an acid number of at least 1 mg KOH/g, obtained by treating a crude oil or a crude oil fraction with an amount of an alkai or alkaline-earth metal hypochlorite sufficient to impart surface-active properties thereto and concomitantly to substantially increase its acid number; and wherein the oil from the field wherein the enhanced recovery operation is effected has an acid number from 0 to 0.5 mg KOH/g.

2. A process according to claim 1, wherein the crude oil or the crude oil fraction subjected to the treatment with a hypochlorite has, before said treatment, an acid number of 0-0.5 mg KOH/g, the treatment being continued until an acid number of at least 1 mg KOH/g is attained.

3. A process according to claim 1, wherein the crude oil subjected to oxidation is a crude oil produced from the field wherein is effected said enhanced recovery.

4. A process according to claim 1, wherein said oxidation is effected at 40°-90° C.

5. A process according to claim 1, wherein said hypochlorite is used as an aqueous solution at a concentration of 0.5-2 moles/liter, calculated as NaOCl.

6. A process according to claim 1 wherein 5 to 25 moles of hypochlorite are used per kilogram of crude oil to be oxidized.

7. A process according to claim 1, wherein the oxidation is effected in the presence of ruthenium oxide.

8. A process according to claim 7, wherein the concentration of said ruthenium oxide is 0.01-0.5% by weight with respect to the weight of said crude oil or crude oil fraction.

9. A process according to claim 1, wherein the surface-active agent is displaced in the field by the driving action of an aqueous displacement fluid.

10. A process according to claim 9 wherein the aqueous displacement fluid is an aqueous sodium hydroxide solution.

11. A process according to claim 9, wherein the aqueous displacement fluid is an aqueous solution of polysaccharide.

12. A process according to claim 1 wherein said surface-active agent is used as a microemulsion.

13. A process according to claim 12, wherein said microemulsion contains a nonionic surfactant.

14. A process according to claim 13, wherein said nonionic surfactant is a polyoxyethylene alcohol or a polyoxyethylene alkylphenol.

15. A process according to claim 13, wherein said microemulsion consists essentially of: 5-50% by weight of said oxidized crude oil; 0-40% by weight of crude oil; 2-15% by weight of said nonionic surfactant; and 20-60% by weight of alkaline water.

* * * * *